Jan. 4, 1949.  G. E. McFARLANE  2,458,089
SOLID AXLE DRIVE MECHANISM FOR VEHICLES
Filed June 29, 1945  5 Sheets-Sheet 1

INVENTOR
G. E. McFarlane
BY E. N. Fetherstonhaugh
ATTORNEYS

Jan. 4, 1949.   G. E. McFARLANE   2,458,089
SOLID AXLE DRIVE MECHANISM FOR VEHICLES
Filed June 29, 1945   5 Sheets-Sheet 2

INVENTOR
G. E. McFarlane
BY E. N. Fetherstonhaugh
ATTORNEYS

Jan. 4, 1949. G. E. McFARLANE 2,458,089
SOLID AXLE DRIVE MECHANISM FOR VEHICLES
Filed June 29, 1945 5 Sheets-Sheet 3

INVENTOR
G.E. McFarlane.
BY E.N. Fetherstonhaugh.
ATTORNEYS

Jan. 4, 1949. G. E. McFARLANE 2,458,089
SOLID AXLE DRIVE MECHANISM FOR VEHICLES
Filed June 29, 1945 5 Sheets-Sheet 4
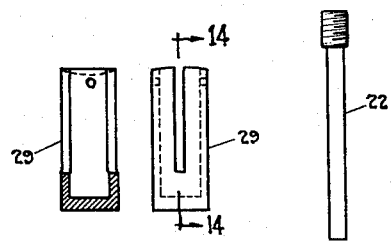
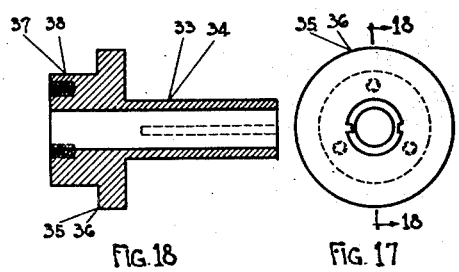
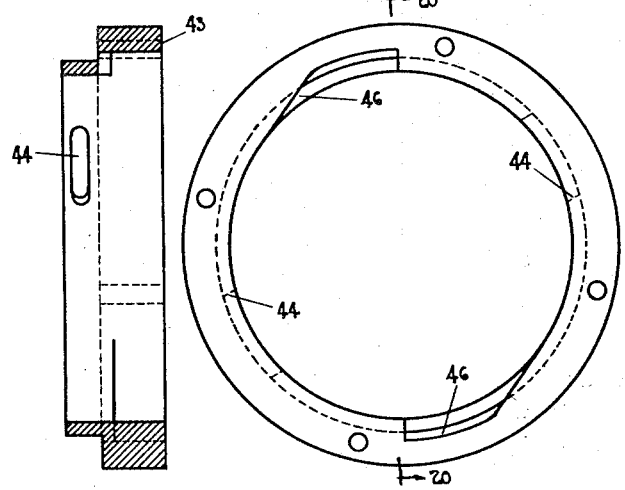
INVENTOR
G. E. McFarlane
BY E. N. Fetherstonhaugh
ATTORNEYS Jan. 4, 1949.  G. E. McFARLANE  2,458,089
SOLID AXLE DRIVE MECHANISM FOR VEHICLES
Filed June 29, 1945  5 Sheets-Sheet 5
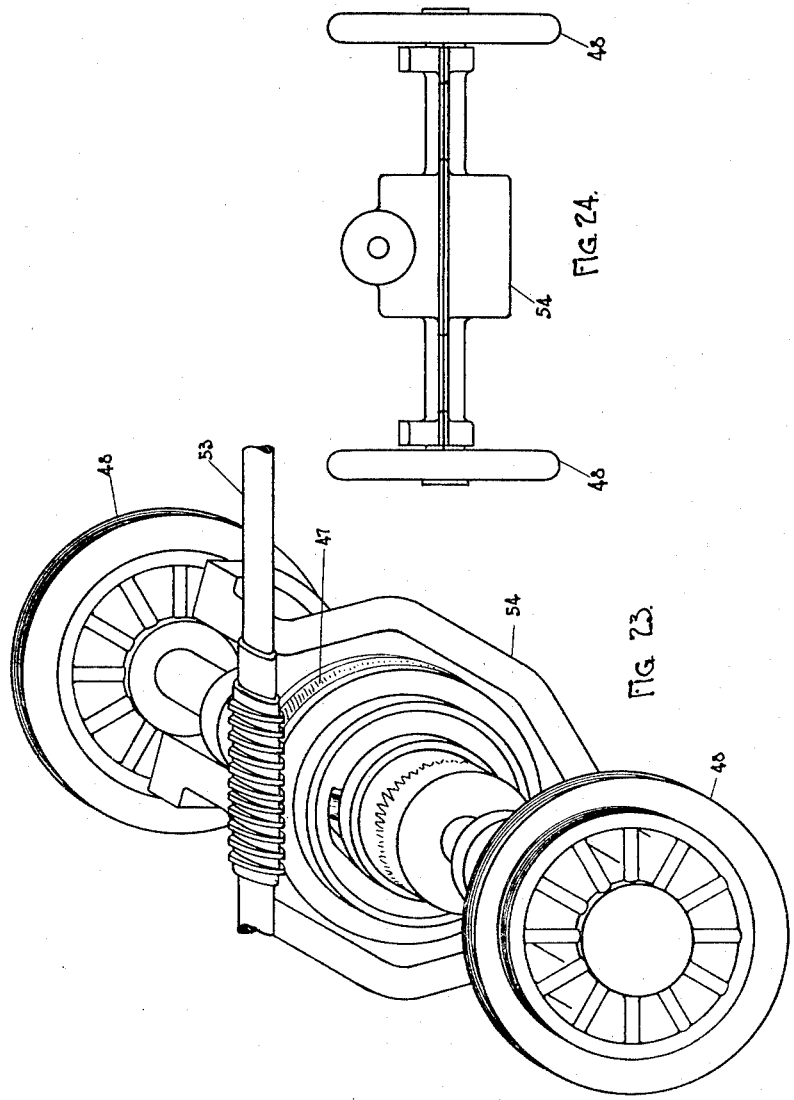
INVENTOR
G. E. McFarlane
BY E. N. Featherstonhaugh.
ATTORNEYS.

Patented Jan. 4, 1949

2,458,089

UNITED STATES PATENT OFFICE 2,458,089

SOLID AXLE DRIVE MECHANISM FOR VEHICLES

Gordon Earl McFarlane, Ville Emard, Quebec, Canada

Application June 29, 1945, Serial No. 602,381

2 Claims. (Cl. 74—389.5)

The invention relates to a solid axle drive mechanism for vehicles as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a means whereby the vehicle wheels, connected to the axle may be operated independently from one another or operated together, and in that way, when the vehicle is travelling around a curve, one wheel may run idly while the other wheel will become the driving force and when the vehicle is driven on a straight line both wheels will be automatically locked so as to form driving wheels; to construct a mechanism that will eliminate the necessity of including a differential and thereby effect a more positive action for operating the vehicle wheels in either reverse or forward motion; to increase the strength in vehicle axles by providing a solid axle and thus minimizing any weaknesses that would otherwise occur in ordinary axle construction that is used at the present time; to reduce the danger of skidding and minimize the amount of friction between the various parts of the mechanism, as well as, to avoid the mishaps that occur when a vehicle is mired through furnishing positive action to both vehicle wheels; and generally to provide a solid axle drive mechanism for vehicles that will be made of comparatively few and simple parts, easy to assemble, durable in construction and efficient in operation.

In the drawings:

Figure 10 is a front elevation of a reversing cam which forms a part of a driving plate.

Figure 11 is a vertical sectional view as taken on the lines 11—11 in Figure 10.

Figure 1:
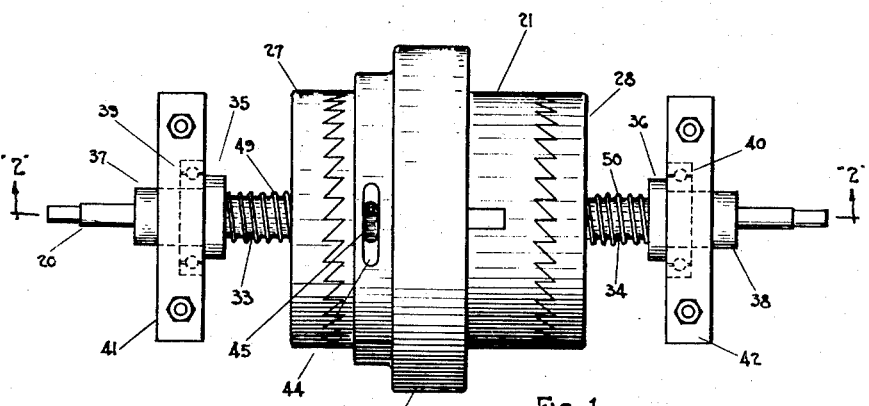
Figure 1 is a front elevation of the solid axle drive mechanism.
Figure 2:
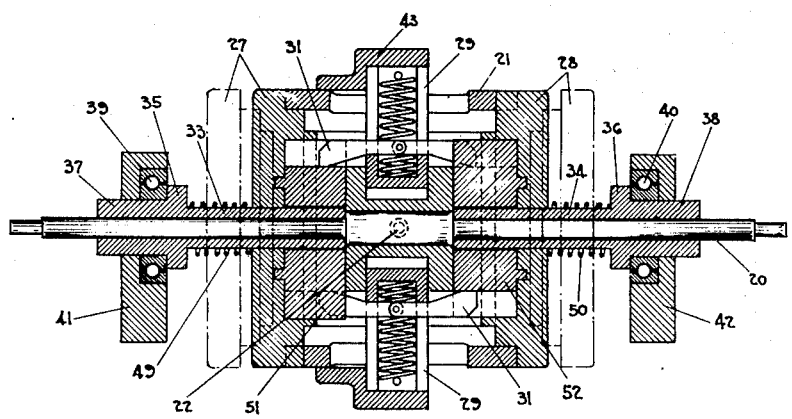
Figure 2 is a longitudinal sectional view of the mechanism as taken on the lines 2—2 in Figure 1.
Figure 3:
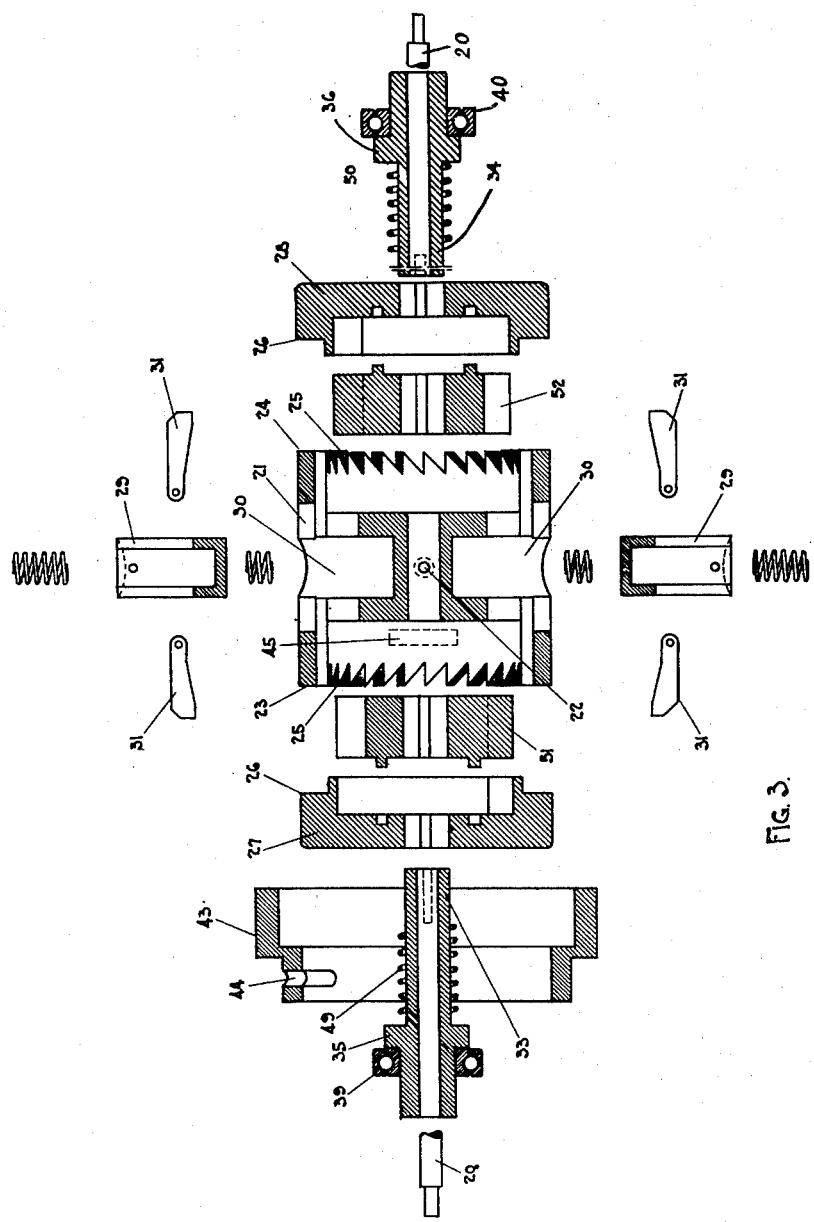
Figure 3 is a diagrammatic view illustrating the various parts of the mechanism ready for assembly.
Figure 6:
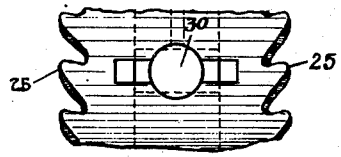
Figure 6 is an enlarged fragmentary detail illustrating the teeth on the driving cylinder.
Figure 5:
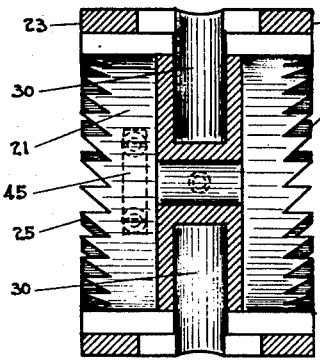
Figure 5 is a cross sectional view as taken on the lines 5—5 in Figure 4.
Figure 4:
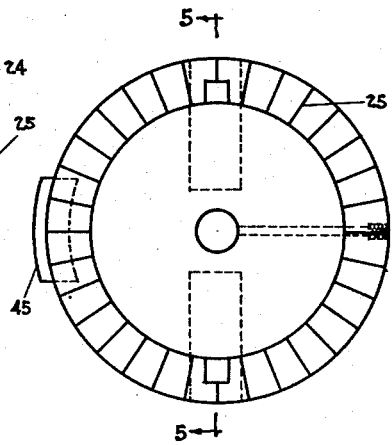
Figure 4 is an end view of a driving cylinder.
Figure 8:
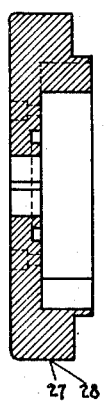
Figure 8 is an end sectional view of the driving plate.
Figure 7:
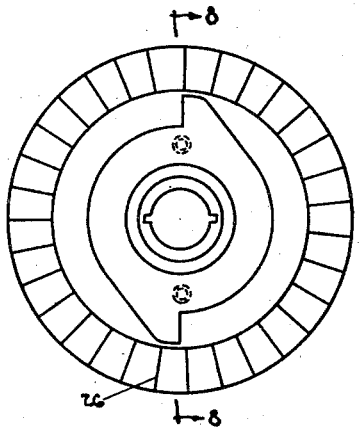
Figure 7 is a plan view of one of the driving plates.
Figure 9:
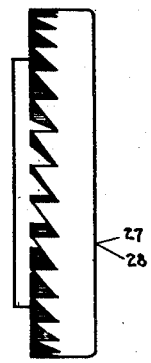
Figure 9 is an end elevation of the driving plate.

Figures 12, 13, and 14 illustrate end, plan, and sectional views, respectively, of the catch carrier.

Figures 17 and 18 are end and sectional views respectively of the spline sleeve.

Figures 19 and 20 are an end and sectional view respectively of the operating collar.

Figure 21 is a plan view of the solid axle.

Figure 22 is a plane view of the threaded pin.

Figure 23 is an isometric view of the differential when assembled.

Figure 24 is an end view of the assembled unit.

Like numerals of reference indicate corresponding parts in the various figures.

Referring to the drawings, the solid axle drive mechanism consists of a solid axle shaft as indicated by the numeral 20 and is connected to a driving cylinder 21 by means of a threaded pin 22 or other suitable fastening means.

The driving cylinder 21 has its circumferential ends 23 and 24 provided with a plurality of driving teeth 25 which are adapted to engage and be disengaged from the teeth 26 of the driven plates 27 and 28. A plurality of carriers 29 are spring held in the seats 30 of the driving cylinder and each of the carriers is provided with a transverse member forming catches 31 and these catches are in turn spring held in the carriers.

The driven plates 27 and 28, which are adapted to engage with the catches 31, are suitably secured to the splined sleeves 33 and 34, the latter having the collars 35 and 36 and bearing members 37 and 38 integral therewith, the springs 49 and 50 are mounted on the sleeves 33 and 34 and are located between the collars thereof and the driven plates 27 and 28 for the purpose of tensioning the driven plates into meshing engagement with the driving cylinder. The ball bearings 39 and 40 are mounted on the bearing members of the splined sleeves and the bearing casings 41 and 42 which enclose the bearings, are suitably secured to an axle housing. The operating collar 43 has a plurality of slotted sections as indicated by the numeral 44 engaging the lugs 45 of the driving cylinder, and the inner surface of the operating collar is formed into the shape of a cam 46 which is adapted to engage and drive the carriers 29. A suitable gear mechanism 47 is connected to the operating collar for the purpose of operating the driving cylinder.

The driven plates are provided with the cams 51 and 52 and their cams engage with the carrier catches 31 when it is desired to operate the drive mechanism in the reverse direction.

The vehicle wheels 48 are suitably secured to the splined sleeves of the shaft and this completes an acceptable form of construction of the solid axle drive mechanism.

In the operation of the invention when it is desired to move the vehicle having the solid axle drive mechanism installed therein in a forward direction, the operating collar 43 engages with the plurality of lugs 45 which project upwardly from the cylinder wall. The operator operates the collar by a side gear mechanism causing the driving cylinder to rotate and as the driven members 27 and 28 are meshed with the teeth of the driving cylinder, the vehicle wheels will rotate in the same direction as a single unit. If the vehicle is turning a curve, the speed of the rotation of one of the driven wheels will defer from the speed of rotation of the other driven wheel, the result is that the wheel having the greater speed of rotation will declutch itself from the driving cylinder and will then rotate independently from the rotation of the axle and the other vehicle wheel. When the curve has been turned and the vehicle is on the straight of way, the declutched wheel will automatically re-engage itself through its driven members and other component parts with the driving cylinder, thereby connecting the mechanism so as to operate in a single unit.

In the case where the vehicle is to be operated in the reverse direction, the operating collar 43 is rotated in the reverse direction and will cause the driving cylinder to also rotate in the reverse direction. This will have the effect of disengaging the intermeshing teeth of the driving cylinder and the driven members, but the driven members will still be connected to the driving cylinder due to the fact that the cams 51 and 52 of the driving members will engage with the reversing mechanism of the driving cylinder.

While the vehicle is going in the reverse direction and is turning a curve, the same operation will take place as occurs when the vehicle is travelling in the forward direction around a curve. That is to say one of the vehicle wheels will disengage itself from the driving cylinder through the mechanism and rotate freely and independent of rotation of the other vehicle wheel.

What I claim is:

1. A solid axle drive mechanism for vehicles comprising a solid axle, a driving cylinder secured to said solid axle and having a plurality of driving teeth at its circumferential ends, and a plurality of projecting lugs on the circumference of said cylinder a plurality of catch carriers having projecting catches spring-held in said driving cylinder and forming a reversing mechanism, an operating collar having a plurality of slots engaging with the lugs on said driving cylinder, the inner circumference of said collar being formed in a cam shape adapted to engage and drive the said catch carriers for reverse motion, sleeve members freely rotatable on said solid axle, driven plates slidably secured to said sleeve members and having a plurality of teeth adapted to detachably mesh with the teeth of said driving cylinder for drive in the forward direction, spring means mounted on said sleeve members for constantly urging said driven plates toward said driving cylinder, cams engaged with said driven plates and adapted to engage with the catch carriers of said driving cylinder for the reverse motion, vehicle wheels secured to said sleeve members, and means for rotating said operating collar.

2. A solid axle drive mechanism for vehicles comprising a solid axle, a driving cylinder secured to said solid axle and having a set of driving teeth projecting from each end thereof, and a plurality of lugs projecting outwardly from the circumference thereof, a plurality of catch carriers spring held in said driving cylinder and forming a reversing mechanism, an operating collar having a plurality of slots engaging with the lugs on said driving cylinder, the inner circumference of said collar being formed with cam depressions adapted to engage and drive the said catch carriers for reverse motion, sleeve members freely rotatable on said solid axle, driven plates slidably secured to said sleeve members and having a plurality of teeth facing inward and adapted to detachably mesh with the teeth of said driving cylinder for drive in the forward direction, spring means mounted on said sleeve members for constantly urging said driven plates toward said driving cylinder, cams engaged with the inner faces of said driven plates and adapted to engage with the catches of said catch carriers for reverse motion, vehicle wheels secured to said sleeve members, and means for rotating said operating collar.

GORDON EARL McFARLANE.

REFERENCES CITED

The following references are of record in the file of this patent:

UNITED STATES PATENTS

| Number | Name | Date |
| --- | --- | --- |
| 1,229,883 | Carlisle | June 12, 1917 |
| 1,420,706 | Hupp | June 27, 1922 |
| 1,462,204 | Tobias | June 17, 1923 |